United States Patent [19]
Dingee

[11] Patent Number: 5,236,386
[45] Date of Patent: Aug. 17, 1993

[54] PORTABLE DEER HOIST AND SUPPORT

[76] Inventor: David Dingee, 405 Wisteria, Lake Jackson, Tex. 77566

[21] Appl. No.: 892,968

[22] Filed: Jun. 3, 1992

[51] Int. Cl.$^5$ .............................................. A22C 15/00
[52] U.S. Cl. ..................................... 452/192; 452/190
[58] Field of Search ............... 452/187, 189, 190, 191, 452/192

[56] References Cited

U.S. PATENT DOCUMENTS

| | | | |
|---|---|---|---|
| 441,517 | 11/1890 | Walker | 452/191 |
| 966,777 | 8/1910 | Sheller | 452/192 |
| 1,622,102 | 3/1927 | Fuller | 452/192 |
| 2,483,631 | 10/1949 | Fashing | 452/190 |
| 4,027,357 | 6/1977 | Morris | 452/192 |

Primary Examiner—Bruce M. Kisliuk
Assistant Examiner—Jack Lavinder
Attorney, Agent, or Firm—Gunn & Kuffner

[57] ABSTRACT

A device for field dressing of game is set forth. It includes an upstanding central strap which connects at its lower end to a pivot means. The pivot means supports a left arm, and a duplicate right arm. They engage the hind legs of game for cleaning. In addition to the left and right arms, replicated components function as left arm and right arm braces connecting with said strap to define a rigid structure. On subsequent deployment of the braces, a pair of snips or a measuring device can be assembled. In the folded condition, the strap defines a collinear arrangement of the various arms.

1 Claim, 2 Drawing Sheets

PORTABLE DEER HOIST AND SUPPORT

BACKGROUND OF THE DISCLOSURE

A small, portable device is set forth in this disclosure which is especially useful for large game hunting such as deer hunting; obviously, it can be used for larger game including elk and the like. This device is useful in skinning and gutting game such as deer and including even larger game, one example being antelope. It is especially useful for game which is sufficiently large that, when shot in the wilderness, it is difficult to move the game. Ideally, it is desirable, even sometimes mandatory, that the freshly killed game be cleaned in the field to avoid meat spoilage. It is highly desirable that the game be gutted and bled in the field so that the meat is protected, and can be carried back from the wilderness location for delivery to a cooler, freeze or other refrigeration system. The present apparatus sets forth such a device. It is particularly small in that it can be folded and carried by the user. Most big game hunts involve treks into a wilderness or wooded location, typically on foot, or at best by horse mounted travel. In any case, the amount of cargo which can be carried is limited.

The present apparatus especially meets this need because it provides a device which is quite small when folded and which can collapse to a very convenient size and yet has only minimal weight. The light weight structure nevertheless unfolds at the time it is needed, providing a structure which has several uses. The several uses will be denoted below but one important use is that the equipment can be used to hoist and hang the carcass of newly killed large game, thereby permitting field dressing. Indeed, the game can be hoisted so that the head hangs downwardly. This is a preliminary step to bleeding the carcass. Another step which is necessary in field cleaning is to hold the carcass in a specific position, then to cut certain parts of the carcass such as specific bones and the like. This apparatus enables that to be done. Moreover, this equipment is particularly adapted for temporary attachment to an overhead rope typically carried by the hunter so that the game carcass can be hoisted so that the hunter can work at a selected elevation on the carcass, carrying out the necessary steps in field dressing.

The present disclosure is a device which is relatively easy to manufacture in comparison with the structure set forth in U.S. Pat. No. 473,127. That device shows a type of hanger with an excessive number of links. Moreover, the links in that device do not enable the device to fold to a neat, narrow package which is easily carried in a back pack, or in a fashion which does not get in the way of other equipment. The same deficiency is noted in U.S. Pat. No. 827,196. Moreover, that device is intended for use in overhead conveyor systems in a slaughter house or the like. A similar structure to the latter is set forth in U.S. Pat. No. 892,719. Of more recent vintage, there is the device shown in U.S. Pat. No. 1,813,600. This device is a type of pivotally mounted hooks somewhat similar to the other references. A slaughter house mechanism is also shown in U.S. Pat. No. 4,027,357. It includes the appropriate leg engaging hooks, but it has a relatively complex pair of braces which enables the device to extend laterally. Finally U.S. Pat. No. 5,049,110 shows a tree mounted support frame that can be momentarily latched to a tree, and provides an overhead pulley support so that a rope can be used to hoist a triangular shaped mechanism engaging the two legs of game to be dressed in the field.

This disclosure is summarized as a structure that is formed of two structural components only, one being a straight frame member. The second structural component is replicated four times in the apparatus. This cuts down on manufacturing cost. It is assembled by providing four pivot points in the system. One of the pivots can be conveniently connected by means of threaded or unthreaded nuts and lock washers in the field. In the closed or compact position, the components lie in a common line so that the portable arrangement of the equipment permits it to fold, thereby being less than two feet in length, and less than about one inch in cross section. Quite obviously, it can be build bigger for handling much larger game. The described size is intended for field dressing of game in a common range of about 80 to 500 pounds undressed weight.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
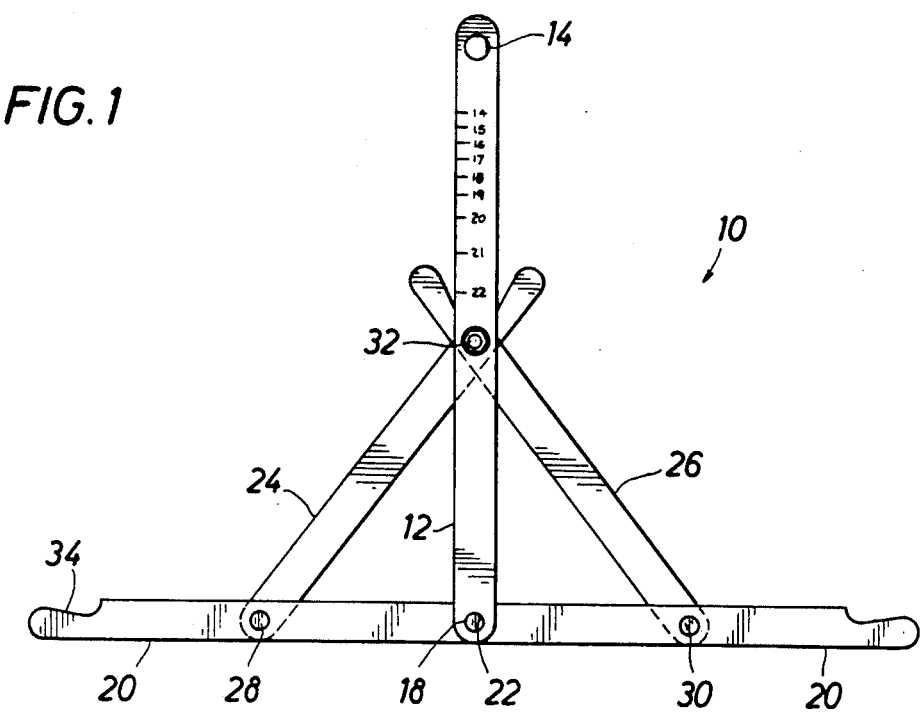
FIG. 1 is a side view of the game hanging apparatus of the present disclosure which illustrates the depolyment of a pair of opposing ends for engaging the rear legs of game to hoist the game for field cleaning and dressing.

Attention is now directed to FIG. 1 of the drawings with the numeral 10 identifies the device of the present disclosure. It is a portable deer hoist which can be folded to the compact arrangement shown in FIG. 4 and yet which is deployed in the arrangement of FIG. 1 for use. This apparatus will be described primarily referring to FIGS. 1 and 2 jointly. Thereafter, the folded construction will be discussed. In addition to that, the several uses of the equipment will be given.

FIG. 1 shows the hoist apparatus 10 which is constructed of two structural components. While there are only two, one is used at four different locations as will be explained. One component is identified by the numeral 12 and is a hanging strap. The strap 12 is constructed of a length of flat metal stock, and has suitable bolt openings at 14, 16 and 18. The bolt openings 14, 16 and 18 are located approximately at the two ends and the mid point. The purpose of these will be given in detail. The second structural component shown in FIG. 1 is identified generally at 20 and will be referred to hereinafter as an arm, and the arms 20 are deployed in a fashion to be discussed in detail. There is a left arm 20 shown in FIG. 1 and a symmetrically positioned right arm 20, the two being fastened to the strap 12 at a fixed bolt 22. The bolt 22 is equipped with a head at each end so that it clamps three members together, and is not permitted to otherwise open. That is, it is made fast to the three members which are permitted to pivot around the bolt 22. There is no need to remove this bolt.

As further shown in FIG. 1, the left arm 20 is pivotally connected to another arm which is deployed as a brace. This brace, identified by the numeral 24 and symmetrically matched by the similar brace 26 at the opposite side, provides a means for connecting the left and right arms so that they extend horizontally at opposite sides. The arms 24 and 26 are used as braces which hold the left and right arms in a fixed location. The arms 24 and 26 are anchored at the lower ends by means of duplicate bolts at 28 and 30, the bolts again being provided with suitable heads so that they are locked in place. By incorporating the bolts with fixed heads so that disconnection is not permitted, the left and right arms along with the left and right braces are fixed together in the fashion shown in FIGS. 1 and 2. Movement of these arms is permitted as will be described.

Another bolt 32 is incorporated with the appropriate bolt head, lock washer and nut. It connects at the center opening 16 in the strap 12. It is included for anchoring the two braces so that they provide support to the left and right arms. The two braces are fixed in location thereby determining the angle at which the left and right arms are deployed. In the preferred construction, it is desirable that the arms extend in opposite directions and at right angles to the strap 12. The strap 12 is provided with the top opening 14 which enables a rope and pulley system to be connected through the opening 14 thereby enabling the hoist mechanism 10 to be lifted above the ground. In a typical circumstance, the rope will be anchored to a tree limb and the hoist 10 is raised by the rope. More will be noted regarding its use.

Of the four connections shown in FIG. 1, the connection 32 is disassembled as often as needed. It is accomplished by threading and unthreading of the nut on the bolt. For convenience in locking, a lock washer is preferably included with the nut, and if desired, a nut provided with finger engaged wings can be used. Likewise, the head of the bolt can be provided with wings to enable easy threading and unthreading if desired. The remaining there pivots are not normally disconnected by unthreading.

Going back to FIG. 1 of the drawings, there is a curvature 34 formed at the end of the arm 20 and this is replicated at all four of the arms. This forms the tip of the arm into something of a hook. When lifting a carcass, this hook is normally forced into that portion of the carcass leg adjacent to the termination of several tendons in a joint in the leg. This enables the carcass to be engaged at the two hind legs for releasable lifting. To accomplish this, it is desirable that the curvature shown at 34 be included in the arm. This is duplicated on the left and right because the requirements at both arms are the same. The notches that are shown at 34 are accompanied with a beveling cut 36 shown in FIG. 2 of the drawings.

Figure 2:
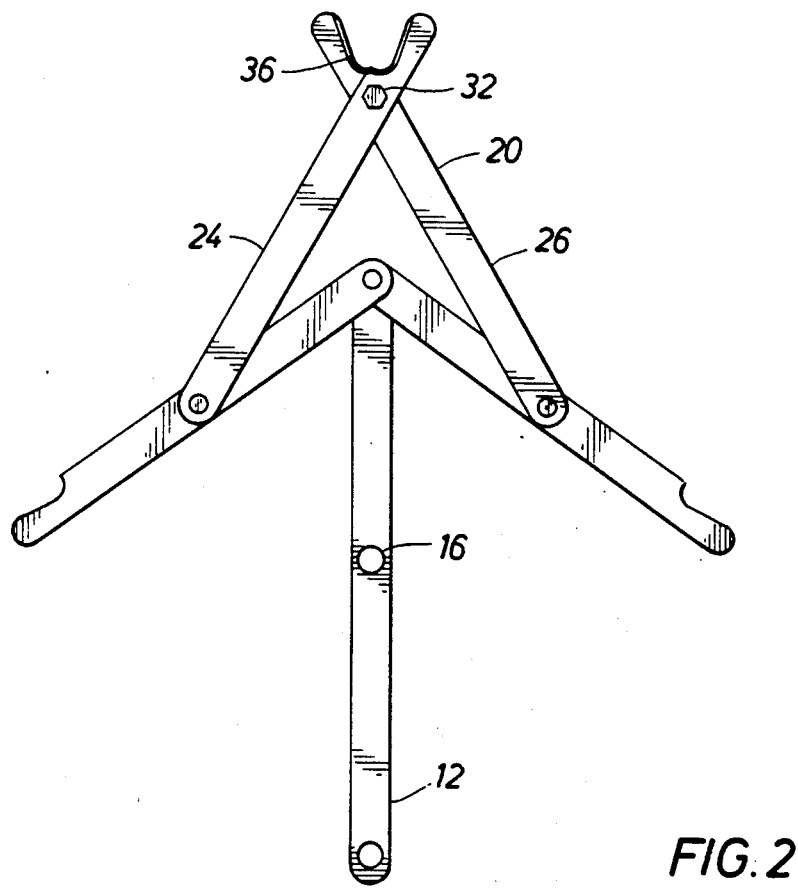
FIG. 2 is a view of the apparatus showing rearrangement of the connective links so that a cutting device is provided for cutting bones of the game necessary to complete field dressing.

In FIG. 2, the braces 24 and 26 serve an entirely different purpose. The brace 24, again on the left, connects with the companion brace to form a pair of snips. This functions in the same fashion as a pair of cutters or heavy duty scissors. The bevel 26 at the notch 34 defines one of the two cooperative cutting edges, the two braces supporting the two cuttings edges as illustrated. It is a relatively rugged cutting device because the leverage determined by the braces is advantageous. It serves the needed purpose of cutting bones or sinewy tissue in the game, and is sometimes necessary for field dressing. That is, a pair of snips or cutters becomes very important in completing a proper field dressing job. The braces pivot about the bolt 32. Pivoting is not permitted in the arrangement shown in FIG. 1 because the strap 12 is connected with the nut and bolt at 32; to therefore provide pivotal movement, the strap 12 must be disconnected from the bolt 32. This can be accomplished in a straight forward fashion simply by unthreading the bolt and the associated nut with it, then rethreading the bolt through the two braces only. The strap is then permitted to hang freely as shown in FIG. 2 of the drawings. When this is done, the left and right arms become less significant to operation. Moreover, the left and right arms connect to the braces to provide an extension of the length of the braces and thereby enhance the mechanical advantage which can be obtained. By hand manipulation, the snipping device shown in FIG. 2 can be deployed to accomplish cutting.

Figure 3:
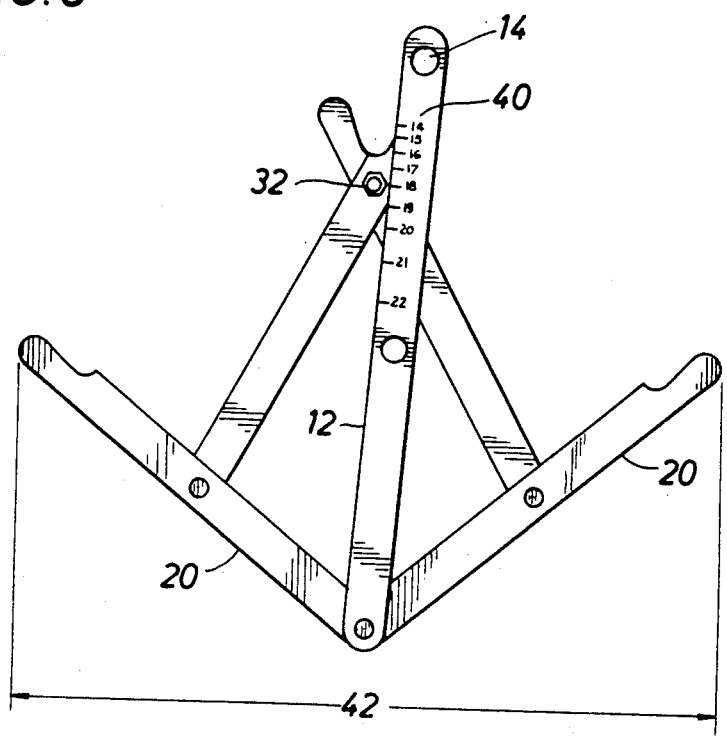
FIG. 3 is a view of the apparatus similar to FIG. 1 where the device is used as a measuring instrument so that the width of a measurement is determined.

Going now to FIG. 3 of the drawings, it is similar to FIG. 2 except that the strap 12 has been rotated to a position where it overlays the snips shown in FIG. 2 of the drawings. Here, the strap is shown to incorporate a number of markings at 40 which provide dimensional measurements. By appropriate scaling of the markings 40 and by control of the lengths of the arms which are deployed to the left and right, a dimension 42 can be measured which is from tip to tip of the respective arms 20 on the left and right. This is accomplished by adjusting the relative angle between the left arm 20 and the right arm 20. When this occurs, the strap is moved relative to the bolt 32 previously mentioned. The bolt 32 serves as a reference point because its position is uniquely tied to the left and right arms, and length varies only with deflection of the arms. In other words, as the arms are opened towards the horizontal, the arms are able to move the relative position of the bolt 32 with respect to the markings 40. As noted, the markings 40 are located so that they are properly correlated to the dimension 42 shown in FIG. 3 of the drawings.

Figure 4:
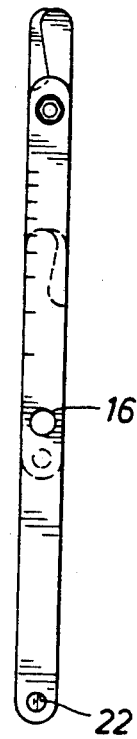
FIG. 4 is a side view of the several connective links which are folded into an easy, convenient parallel arrangement permitting travel.

FIG. 4 shows the present equipment folded. It is folded by moving the arms shown in FIG. 3 so that the snips are completely closed. The left arm is rotated through 90° of rotation. That automatically requires that the right arm rotate in the same fashion. This brings the left arm parallel to the strap 12. This brings the right arm parallel to the strap 12 also and immediately adjacent to the left strap. To accomplish this, pivoting occurs around the bolt 22 shown in FIGS. 4 and 5. Moreover, this positions the strap 12 at one side of the folded apparatus, see FIG. 5. This also positions the two arms 20 on the common bolt 22 at positions which are parallel to the strap. This locates three of the components in the necessary collinear deployment of FIGS. 4 and 5. In addition, that movement also causes the braces 24 and 26 to rotate to the common collinear arrangement.

Figure 5:
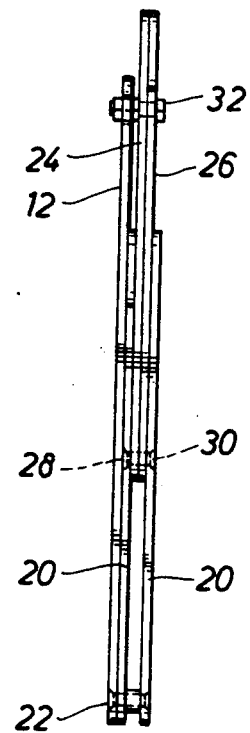
FIG. 5 is a side view of the compact arrangement shown in FIG. 4 by which travel or portability is accomplished.

They are rotated on the pivots determined by the bolts 28 and 30. These two bolts are positioned in axially aligned positions as shown in FIG. 5 of the drawings. Moreover, this position then enables a user to simply loop a piece of rope or the like around the equipment to tie the five structural components in a parallel position for easy transportation. As shown in FIG. 4, the snips are closed so that they do not provide any risk during transportation.

To accommodate this closed position, it is desirable that the bolt 32 have greater length than the bolt 22, and it is provided with at least a pair of nuts threaded to the bolt. In like fashion, the opening 14 at the top end of the strap is preferably a longer slot in some instances so that the bolt 32 can be properly aligned with the strap 12. This is not critical because the opening 14 primarily functions to engage and hold the rope which is tied to the equipment for over head hoisting. To the measure that dimensions vary, the opening 14 can be enlarged into an oval to thereby permit proper alignment of the bolt 32 with the opening 14 in the strap.

USE IN A FIELD LOCATION

The present apparatus is transported folded in the fashion shown in FIGS. 4 and 5. This provides a length of less than about two feet, and defines a relatively thin structure which can be easily inserted into camping gear, back pack, etc. In any event, in this deployed arrangement, it an be readily moved to the field. In the field, one of the steps involved in field dressing requires deplopyment of the equipment shown in FIG. 2 of the drawings to cut bones of the game. This can be obtained by unfolding the apparatus, moving the strap 12 to the position where it is out of the way, and then making the cuts necessary with the equipment. Another aspect of the use of this device is to make necessary measurements, such measurements being helpful for instance in estimating the weight of the game. This can be accomplished by using the equipment in the fashion shown in FIG. 3. The dimension 42 is measured in that deployment. At the time it is necessary to hoist the carcass of the game, the equipment is then deployed in the fashion shown in FIG. 1. The left and right arms are properly connected to the hind legs as mentioned. An over head tree limb is located, a rope is passed over the limb, and the rope (with pulleys as needed) is used to raise the present apparatus 10. Since the two hind legs are properly engaged, the hoisting movement will raise the game, thereby permitting the carcass to be raised depending on the multiplication of the pulley system, strength of the rope, and other factors which are readily understood. The game is hoisted, suspended with the head downwardly, and this permits field bleeding in the best fashion. The necessary field dressing techniques are applied to clean and bleed the carcass so that the field dressed meat is protected. This may take the better part of an hour to accomplish field dressing. Again, that depends on the facility of the hunter and the equipment at hand. This particular equipment enables expedited dressing because it is only necessary that the carcass be cut, and as the offal is cut, it will fall out of the craw of the carcass. Bleeding and cleaning is thus accomplished while the carcass is suspended at a convenient height to the user. When that is over, the user can then cut, strip or otherwise convert the carcass into either a single carcass or into multiple segments for easy transportation out of the game hunting area back to a meat locker for freezing. This apparatus is thus used at the field location and can then be refolded to the position shown in FIGS. 4 and 5 for easy storage and travel after use.

While the foregoing is directed to the preferred embodiment, the scope thereof is determined by the claims which follow:

I claim:

1. A portable dressing structure for dressing game in the field, comprising:
    an elongate strap having an upper strap end and a lower strap end;
    said upper strap end including means for engagement with an overhead tree limb to suspend the carcass of freshly killed game therefrom;
    right and left arms of equal length both having inner and outer ends;
    wherein said inner ends of said right and left arms are pivotally connected to said lower strap end;
    right and left arm braces of equal length both having upper and lower ends;
    wherein said lower ends of said right and left arm braces are pivotally connected to said right and left arms, respectively;
    wherein said upper ends of said arm braces are pivotally connected to each other;
    means for connecting said arm braces to said elongate strap to thereby rigidly support said arms in a substantially horizontal position;
    means for engaging the hind legs of game to suspend the game carcass, said engaging means being deployed at a spacing determined by the length of said arms;
    said arms and said arm braces are all the same length thereby simplifying manufacturing and reducing the cost of production;
    said elongate strap, said arms, and said arm braces have a common width and thickness; and
    wherein said elongate strap, said arms and said arm braces provide a structure that compactly folds such that said elongate strap, said arms and said arm braces fold immediately adjacent one another into a colinear structure.

* * * * *